US011658590B2

(12) United States Patent
Richards

(10) Patent No.: US 11,658,590 B2
(45) Date of Patent: May 23, 2023

(54) INTERLEAVED CONTROLLERS

(71) Applicant: Digipulse Ltd, Birmingham (GB)

(72) Inventor: Bryn Geoffrey Richards, Birmingham (GB)

(73) Assignee: SHENZHEN DIJIPUSI KEJI CO, LTD, Shenzhen (CN)

(*) Notice: Subject to any disclaimer, the term of this patent is extended or adjusted under 35 U.S.C. 154(b) by 0 days.

(21) Appl. No.: 17/766,944

(22) PCT Filed: Oct. 7, 2020

(86) PCT No.: PCT/EP2020/078080
§ 371 (c)(1),
(2) Date: Apr. 6, 2022

(87) PCT Pub. No.: WO2021/069479
PCT Pub. Date: Apr. 15, 2021

(65) Prior Publication Data
US 2022/0352835 A1 Nov. 3, 2022

(30) Foreign Application Priority Data
Oct. 7, 2019 (GB) .................... 1914485

(51) Int. Cl.
*H02P 6/18* (2016.01)
*H02P 6/182* (2016.01)
*H02K 21/12* (2006.01)

(52) U.S. Cl.
CPC ............. *H02P 6/182* (2013.01); *H02K 21/12* (2013.01); *H02P 2209/11* (2013.01)

(58) Field of Classification Search
CPC ................ H02P 6/182; H02K 21/12
(Continued)

(56) References Cited

U.S. PATENT DOCUMENTS 5,493,200 A * 2/1996 Rozman ............ H02P 9/08
322/14
5,569,994 A * 10/1996 Taylor ............ H02P 6/18
318/700
(Continued)

FOREIGN PATENT DOCUMENTS

EP 0266598 A2 5/1988
EP 3396846 A1 10/2018
WO 2017/180850 A1 10/2017

OTHER PUBLICATIONS

Combined Search and Examination Report for Application No. GB1914485.6, dated Apr. 6, 2020, 5 pages.
(Continued)

*Primary Examiner* — Erick D Glass

(57) ABSTRACT

A motor system comprises a motor comprising: a stator with a plurality of subwindings each having a plurality of phase connections for receiving phase voltages, wherein each of the subwindings is electrically insulated from each of the other subwindings; a rotor comprising a plurality of permanent magnets or energisable electromagnets; a controller comprising a plurality of control parts, each control part associated with a respective subwinding, each control part being configured to monitor phase voltages of the associated subwinding, between phase connections. The system further comprises a controller configured to: obtain, from each control part, at set discrete time intervals, a plurality of back measured electromotive force, EMF, readings for each of the respective subwindings; using the plurality of measured back EMF readings and an a priori knowledge of the motor's construction to estimate a commutation event timing.

28 Claims, 15 Drawing Sheets

• ISOMETRIC DIAGRAM OF A MOTOR WITH TWO WINDINGS (SLOTLESS MOTOR)

(58) Field of Classification Search
USPC .................................................. 318/400.34
See application file for complete search history.

(56) References Cited

U.S. PATENT DOCUMENTS

| | | | |
|---|---|---|---|
| 5,982,067 A | 11/1999 | Sebastian et al. | |
| 6,462,491 B1 | 10/2002 | Iijima et al. | |
| 6,765,425 B2 * | 7/2004 | Vaysse .................. | H02M 7/219 |
| | | | 363/125 |
| 2005/0116675 A1 * | 6/2005 | Dooley .................. | H02K 29/12 |
| | | | 318/400.04 |
| 2017/0324359 A1 | 11/2017 | Cameron et al. | |
| 2019/0229669 A1 | 7/2019 | Yamakawa et al. | |

OTHER PUBLICATIONS

International Search Report and Written Opinion for Application No. PCT/EP2020/078080, dated Dec. 21, 2020, 16 pages.
Intention to Grant for Application No. GB1914485.6, dated Feb. 9, 2022, 2 pages.
International Preliminary Report on Patentability for Application No. PCT/EP2020/078080, dated Apr. 21, 2022, 11 pages.

* cited by examiner

- ISOMETRIC DIAGRAM OF A MOTOR WITH TWO WINDINGS(SLOTLESS MOTOR)

- A MOTOR WITH ONE WINDING & 6 SLOTS
  (OTHER WINDING PATTERNS ARE POSSIBLE)
  eg. multiple turns
  *This is an example only

- A MOTOR WITH TWO WINDINGS & 6 SLOTS
  IN THIS EXAMPLE, THE 1ST & 2ND
  WINDING SHARE THE SAME SLOTS

• A MOTOR WITH TWO WINDINGS&12 SLOTS

• A MOTOR WITH TWO WINDINGS&12 SLOTS

- A MOTOR WITH 1 WINDING & 1 CONTROLLER (Y-CONNECTED)

- A MOTOR WITH 2 WINDING
  (Y-CONNECTED)

...AND DELTA-CONNECTED:
(NO NEUTRAL POINTS)

- Back EMF data collected from three phase-to-phase voltages with phase offset

- Back EMF data after phase correction

INTERLEAVED CONTROLLERS

This application is a US National Phase Application of International Patent Application No. PCT/EP2020/078080, filed on Oct. 7, 2020, which is based on and claims priority to and benefits of British Patent Application No. GB1914485.6, filed on Oct. 7, 2019. The entire content of the above-identified applications is incorporated herein by reference.

TECHNICAL FIELD

The present invention relates to controllers for brushless electric motors.

BACKGROUND

Many electric motors rely on permanent magnets although other motor types do not, including induction motors and switched reluctance motors. A typical motor normally incorporates a rotor with magnets or capable of becoming magnetised and a stator capable of producing electromagnetic fields when electrical current passes through windings in the stator. Individual electrical conductors (usually wires) are distributed around the stator circumferentially, sometimes grouped within discrete "slots" (depressions intended to house conductors). Individual wires are typically connected in series and in parallel according to a "winding pattern". A winding pattern is a manner of grouping individual wires together so that, however they might be distributed within the motor, a controller can act upon the wires collectively by applying voltage to (and passing current through) a limited number of phase connections. For example, in a single-phase motor, all of the wires within the motor are ultimately connected to the controller at only two points (ie there are only two bundled wires making the connection between the motor and the controller). In a three-phase motor, there are typically three connections between the motor and controller (or four if the motor is "Y-connected" with a neutral point connection to the controller). Higher-phase motors are rare.

In general, the motor's "winding pattern" refers to how a limited number of phase connections distribute electrical current about the motor through a larger number of electrical conductors. The winding pattern defines a simplification of the interface between the motor and the controller. Limiting the motor's phase connections is useful if, for example, (1) the connection between the controller and the motor must be broken and re-made during the motor's service life, making a large number of connections inconvenient;
(2) the controller is incapable of differentiating between a larger number of connections and managing the application of voltage and current to those connections;
(3) the controller is located remotely from the motor and it is infeasible to insulate a large number of conductors from each other over a long distance with flexible and convenient cables; and/or
(4) limitations of the controller mean that there is an advantage in the number of phases within the motor being less than or equal to the number of phases of the controller's power source, and the power source is a conventional electricity network such as a national grid that typically has three phases for reasons analogous to advantages 1 and 3 above.

The above advantages in limiting a motor's phase connections are irrelevant to a large number of electric motors. Advantage 2, that a controller may be incapable of dealing with a larger number of connections may be rephrased as, "the controller could become too expensive if it must deal with a large number of connections". However, this consideration becomes less significant with every advance in semiconductor technology and computing. The counterpoint is that motor operation could be improved using a larger number of phase connections. Just as motors almost universally derive advantages from having a number of "slots" (channels for locating and distributing the winding's conductors about the circumference of the motor) that greatly exceeds the number of the winding's phase connections, so it can be advantageous that a modern motor control system should have the opportunity to detect and to control the behaviour of the conductors at the level of slots, or at any rate some finer level than the simplified level of conventional single-phase and three-phase phase connections.

SUMMARY

Aspects of the invention are set out in the appended claims.

The stator may comprise a plurality of slots in which the phases of the subwindings are accommodated. Optionally, a phase or phases of one subwinding shares or share slots with a phase connection or phase connections of one or more further subwindings. Phases accommodated within the same slot may be caused to be energised by their respective controllers substantially in synchronisation.

An aspect of the invention provides a control part for a motor, the control part being configured to monitor phase voltages of the associated subwinding, between phase connections, and to determine therefrom a commutation timing for the subwinding.

According to an aspect of the invention there is provided a controller for a motor according to another aspect, wherein the controller is configured to:
  obtain, from each control part, at set discrete time intervals, a plurality of back electromotive force, EMF, readings for each of the respective subwindings;
  estimate an overall back EMF of the motor by:
  using an estimator to estimate a value for a first estimator variable based on the readings; and
    estimating a value for an overall back EMF of the motor using the first estimator variable; and
  estimate a motor position based on the value of overall back EMF; and
  estimate a commutation event timing based on the estimated motor position.

According to an aspect of the invention there is provided a system of networked controllers comprising a plurality of controllers according to the preceding, configured to:
  receive from each of a plurality of controllers, each controller associated with a respective one of either: a plurality of subwindings or a plurality of linked motors, respective values for the first estimator variable;
  combine the values of the first estimator variable into an overall value of the first estimator variable; and
  estimate the overall back EMF based on the overall value.

According to an aspect of the invention there is provided a method of controlling a motor according to one of the above aspects, the method comprising:
  obtaining, from each control part, at set discrete time intervals, a plurality of back electromotive force, EMF, readings for each of the respective sub-windings;

estimating an overall back EMF of the motor by:
using an estimator to estimate a value for a first estimator variable based on the readings; and
estimating a value for an overall back EMF of the motor using the first estimator variable;
estimating a motor position based on the value of overall back EMF; and
estimating a commutation event timing based on the estimated motor position.

The first estimator variable may be an arithmetic mean determined for respective discrete time intervals.

The method may further comprise estimating the overall back EMF of the motor by:
estimating respective values of the first estimator variable, a second estimator variable and a third estimator variable, wherein the first estimator is an amplitude of a sine wave, the second estimator is a frequency of the sine wave and the third estimator is a phase of the sine wave, the sine wave representing an estimate of the back EMF; and
estimating values of back EMF based on respective values of the first estimator variable, the second estimator variable and the third estimator variable.

Estimating respective values of the first estimator variable, the second estimator variable and the third estimator variable may comprise using a least squares estimate.

The method may further comprise comprising providing voltages with a phase offset between the subwindings and removing the offset from the back EMF readings prior to estimating an overall back EMF of the motor.

The method may be implemented on a motor wherein a first subwinding of the plurality of subwindings has a first number of parallel conductors and a second subwinding of the plurality of subwindings has a second number of parallel conductors, the first number of parallel conductors being different from the second number of parallel conductors.

The method may further comprise:
applying a first weighting factor to EMF readings for the first subwinding and a second weighting factor to EMF readings for the second subwinding; and
estimating the overall back EMF based on the EMF readings weighted according to respective weighting factors.

The method may further comprise
providing a first current to a first subwinding and a second current to a second subwinding, the first current being different from the second current;
applying a first current weighting factor to EMF readings for the first subwinding and a second current weighting factor to EMF readings for the second subwinding; and
estimating a value for an overall back EMF of the motor based on the EMF readings weighted according to respective current weighting factors.

The first current may correspond to a current level in normal operation of the motor and the second current may correspond to a current level lower than the current level of normal operation.

The first current may correspond to a current level higher than the current level of normal operation of the motor and the second current is a current level lower than the current level of normal operation.

The method may further comprise alternating the different currents between different windings.

The method may further comprise
obtaining back EMF readings from a plurality of linked motors;
combining the back EMF readings from each of the plurality of motors for each discrete time interval; and
estimating the overall back EMF based on the combined readings.

The method may further comprise:
receiving from each of a plurality of controllers, each controller associated with a respective one of either: a plurality of subwindings or a plurality linked motors, respective values for the first estimator variable;
combining the values of the first estimator variable into an overall value of the first estimator variable; and
estimating the overall back EMF based on the overall value.

The method may comprise:
during operation of the motor, disconnecting all phase windings of one particular sub-winding from the power supply for a given time interval;
monitoring one or more phase voltages of this sub-winding during said given time interval; and
determining a commutation timing from the monitored phase voltage(s) and offsetting it as needed to obtain commutation timings for other sub-windings, according to the physical offset of each other sub-winding from the sub-winding for which power was temporarily disconnected.

The method may comprise, subsequent to said given time interval, monitoring one or more phase voltages of one or more sub-windings and using a result to update said commutation timing. The step of monitoring one or more phase voltages of one or more sub-windings may comprise monitoring one or more said phase voltages during one or more discrete time intervals within each electrical cycle of the phase voltage(s), during which the monitored phase voltage is expected to comprise substantially only the induced back electromotive force, EMF.

The Method May Comprise:
monitoring the phase windings of the first sub-winding to obtain first commutation timing data and applying a first reliability score to that data;
obtaining second commutation data from a monitoring of one or more of the other sub-windings of the motor and applying a second reliability score to that data; and
obtaining a commutation timing for the first sub-winding by selecting one or other of the first and second commutation data based upon the relative reliability scores.

BRIEF DESCRIPTION OF THE DRAWINGS

FIG. 3 is a diagram illustrating a 12-slot motor wound, in each case, with two independent sub-windings.

DETAILED DESCRIPTION

The present disclosure provides a controller which is split into many cooperating parts, and a motor winding into several sub-windings, each electrically insulated from the others. In a conventional motor winding, all of the individual conductors are connected together such that it is possible to pass current between any two of the winding's connection points and, by cycling through every permutation of connection points, to pass current through every conductor in the motor. In an embodiment, individual conductors of a winding are grouped into several electrically independent sub-windings. Although the various sub-windings interact through the magnetic fields present in the motor, current does not pass between them. Nonetheless, the sub-windings of a given winding are energised substantially in synchronisation, i.e. they behave as if they form a single conventional winding. In an embodiment, the motor can have more than one phase, with each sub-winding comprising a number of phases, all of which are electrically isolated from other sub-windings, each of which other sub-windings comprises a number of phases.

Each of the several sub-windings will in general each transmit less electrical power into the motor 100 than one winding providing the same motor with electricity. The several windings can each therefore use thinner conductors or fewer conductors in parallel, potentially making the motor easier to manufacture or reducing the amount of space required inside the motor for the conductors (increasing the slot fill factor or reducing the size of the end-windings).

Figure 1:
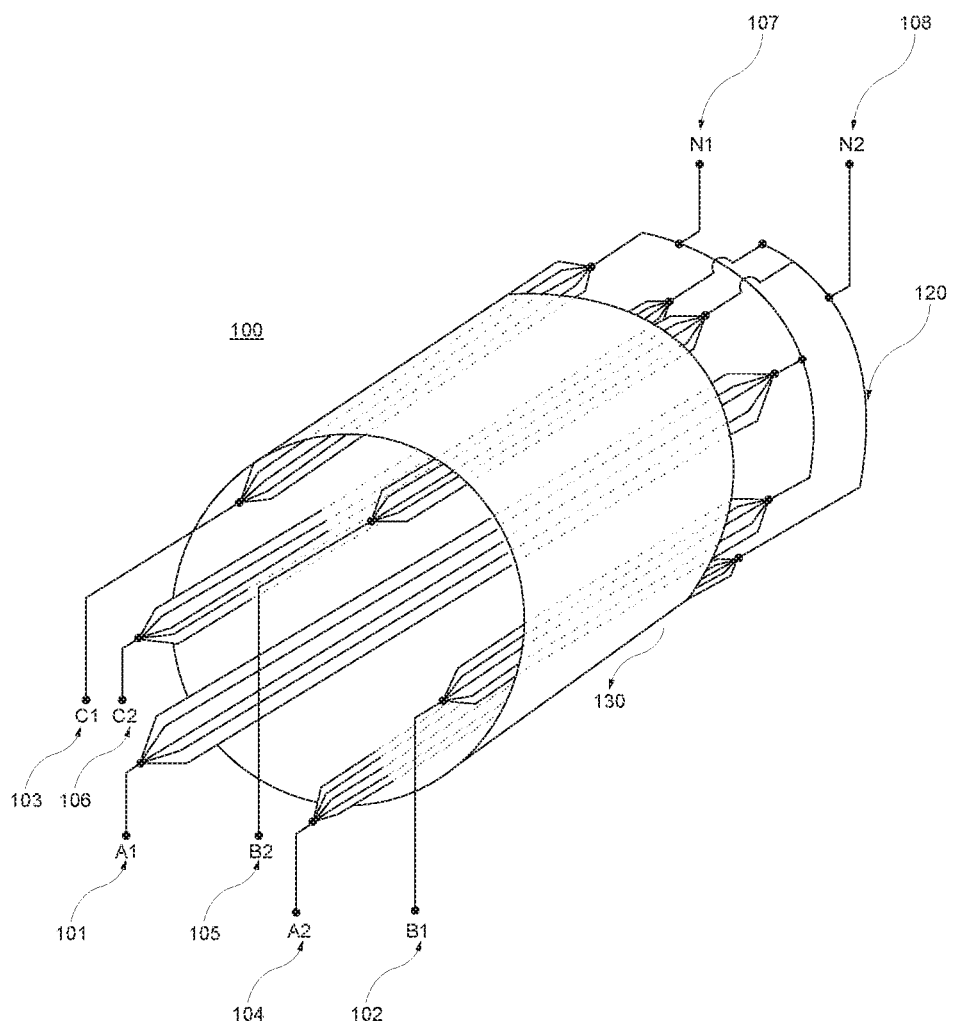
FIG. 1 is an isometric drawing of a slotless motor with two sub-windings.

FIG. 1 is an isometric drawing of a slotless motor 100, according to an embodiment. showing how a motor could be constructed so as to have two sub-windings 110, 120. In FIG. 1, the windings are shown as rotationally offset by 60 degrees, and to rotationally offset the various sub-windings is one embodiment. In another embodiment, the sub-windings could be co-located, so that there is no net rotational offset. As long as the rotational offset of the sub-windings is "known" to the control system, then the back-EMF data pertaining to each can be applied, with a suitable phase correction, to refining the control of the other.

Figure 2A:
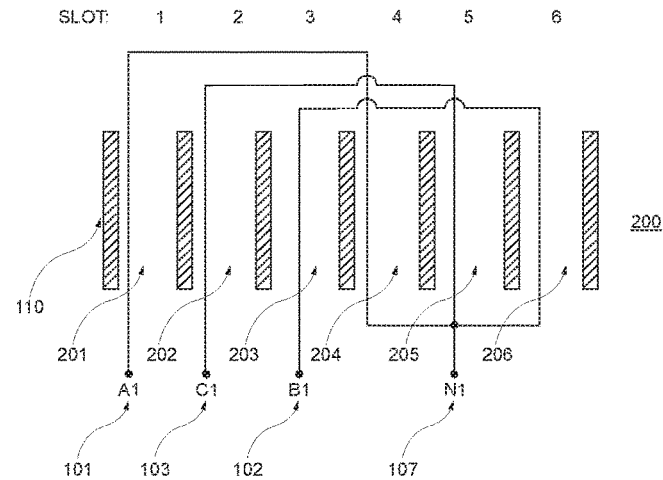
FIG. 2 illustrates, in a diagrammatic view that is standard for the industry, a 6-slot motor that is wound (a) with a single winding and (b) with two sub-windings.
Figure 2B:
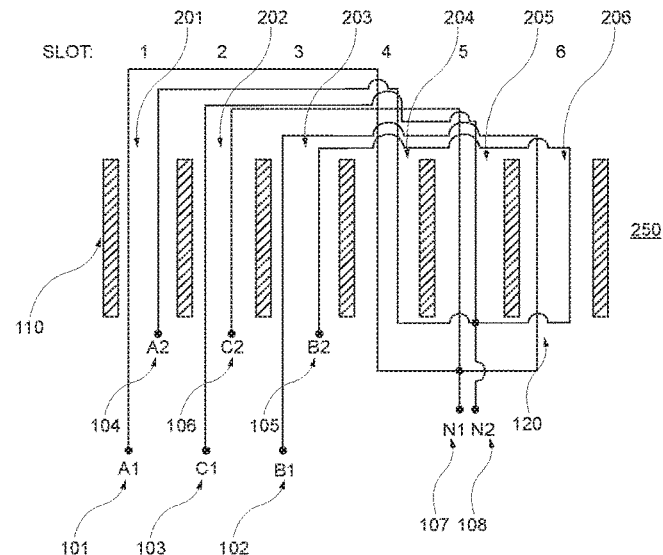

FIG. 2 illustrates, in a diagrammatic view that is standard for the industry, a 6-slot motor 200, according to embodiments. The motors are respectively wound (a) with a single winding (FIGS. 2a) and (b) with two sub-windings (FIG. 2b). The example shown incorporates only a single turn, and the two sub-winding example (b) shows the sub-windings without a phase offset. In this example, the single-winding motor (a) of FIG. 2a and the two sub-winding motor (b) of FIG. 2b would be functionally the same if the sub-windings 110, 120 in (b) were shorted together (Connection A1 101 connected to connection A2 104, connection B1 102 connected to connection B2 105, and connection C1 103 connected to connection C2 106). Thus, the two sub-winding motor (b) could be made to function when connected to a conventional single controller. However, when connected to two sub-controllers, the two sub-windings 110 and 120 of motor (b) may each transmit half the total current, allowing the sub-controllers each to be rated for only half the total current. If, furthermore, the two sub-controllers form part of a logically connected control system, then wherever a single controller would have access to one estimate of back-EMF (e.g., a particular phase-to-phase voltage), the control system governing two sub-windings now has access to two independent samples of the motor's back-EMF— one arising from sub-winding 1 and the other arising from sub-winding 2. As such, the control system has the potential to formulate a more accurate estimate of the motor's position, by taking multiple readings.

Figure 3A:
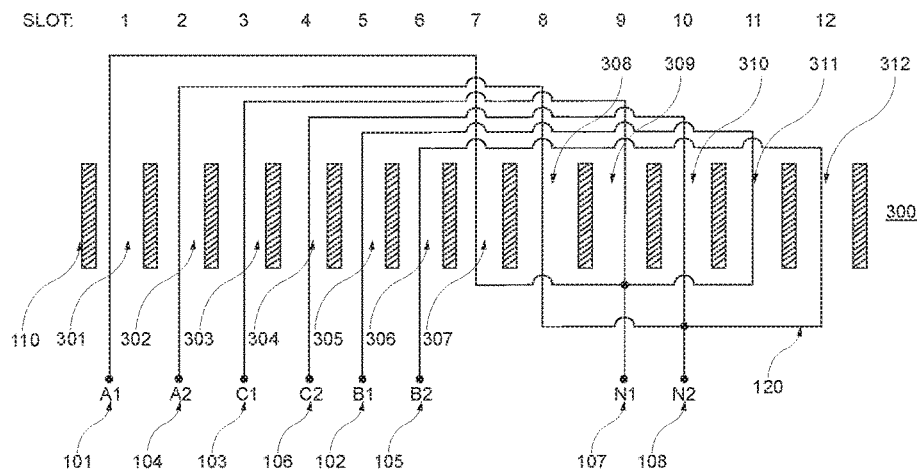
FIG. 3a illustrates the sub-windings wound with a 30-degree offset.
Figure 3B:
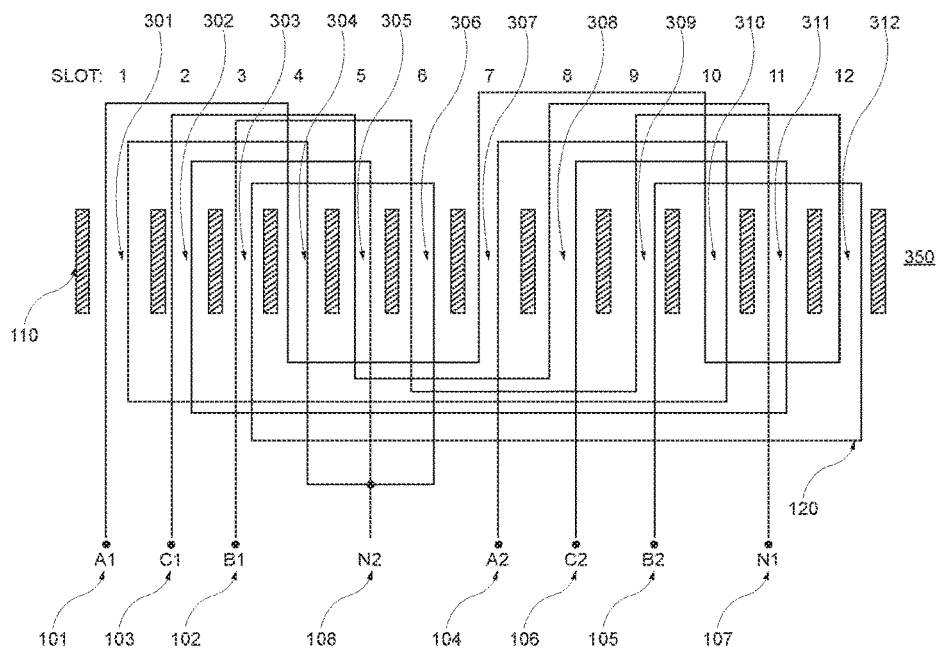
FIG. 3b illustrates the sub-windings wound with a 180-degree offset.

FIG. 3 illustrates a 12-slot motor wound 300, according to embodiments. In each case, the motors have two independent sub-windings 110, 120. The first part (a) (FIG. 3a) illustrates the sub-windings 110,120 wound with a 30-degree offset, and the second part (b) (FIG. 3b) illustrates the sub-windings wound with a 180-degree offset. The first part (a) is also wound in such a way that each slot 301-312 carries conductors from only one of the two sub-windings, whereas part 2 (b) is wound so that each slot 301-312 carries conductors from both sub-windings. In general, and especially with higher slot numbers, the choices of number of sub-windings per slot, number of turns, and rotational offset of the sub-windings are independent design choices. The choices affect the currents and voltages required to drive each sub-winding, the design of the controller, and the impact that the operation of the controller will have on the stability of its power source. The choice of rotational offset also affects the methodology that will be used within the control system to compare and utilise the back-EMF data arising from each sub-winding. If each sub-winding is substantially identical except for the rotational offset, then the back-EMF produced at each sub-winding is substantially identical except for being offset in time (or rotational angle of the motor), and they can be combined using least-mean-squares estimation that incorporates this assumption.

Figure 4:
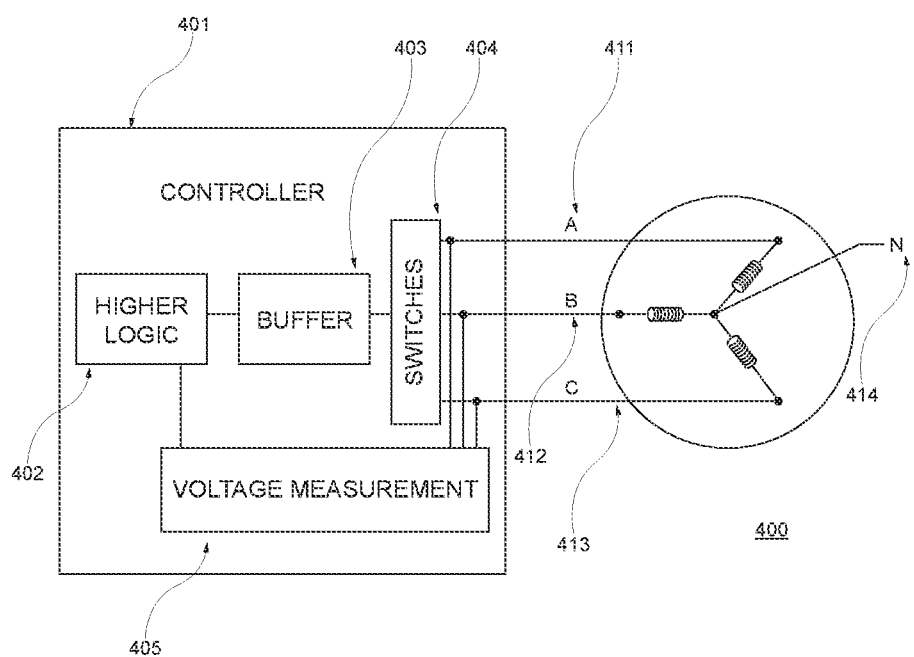
FIG. 4 is a block diagram schematic of a conventional brushless motor controller with motor having a single winding in the "y-connected" configuration.

FIG. 4 shows a block diagram schematic 400 of a conventional brushless motor controller 401 with motor having a single winding in the "y-connected" configuration (with connections for three phases 411, 412, 413 and a neutral connection 414), illustrated in the conventional way. The controller 401 comprises higher logic 402, a buffer 403, switches 404 and a voltage measurement module 405.

Figure 5:
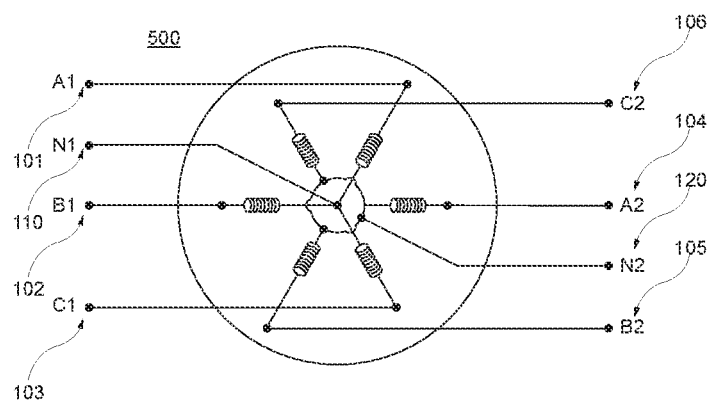
FIG. 5 is a wiring diagram showing examples of the "y-connected" and "delta-connected" configurations of motors having two sub-windings.
Figure 5:
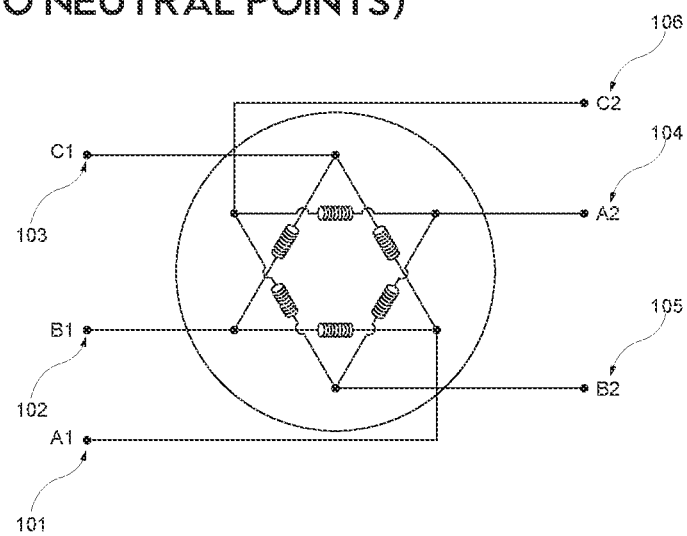

FIG. 5 shows examples of the "y-connected" and "delta-connected" configurations of motors having two sub-windings. The y-connected arrangement has two windings 110, 120, each with respective phase connections 101-103 and 104-106 and neutral connections 107,108. The delta-connected arrangement has only phase connections 101-103 and 104-106. These examples illustrate the electrical independence of the sub-windings from each other.

Rather than having an independent controller acting upon each winding, according to an embodiment, a control system is provided which acts upon all of the sub-windings such that data is shared between the various functional parts of the control system associated with each of the sub-windings. Each sub-winding has an associated control part or sub-controller. In an embodiment, the control system comprises a single controller. In such an arrangement, the controller comprise a plurality of control parts associated with respective the sub-windings. In another embodiment, the control system comprises a network of controllers, each acting as a control part for a respective sub-winding. As each sub-winding in general transmits less power than a single winding, so each controller part within the control system transmits less power than a single controller would. Thus, the semiconductor switches (eg MOSFETs or IGBTs) controlling the flow of current and the application of voltage to each sub-winding can be rated for lower currents and power as compared to the semiconductor switches in a controller for a conventional single winding motor. Such an arrangement provides an advantage in that the semiconductor switches having lower current and power ratings may be less expensive and/or more widely available than the semiconductor switches rated for a single winding for the same motor.

Within the motor and within the control system, the size, power rating, or cost of various components may be reduced by this invention. However, an additional motivation behind the present invention is to increase the quantity of data captured from the motor as compared to a single controller affecting a single winding. Using the additional data, the control system for the motor comprising multiple sub-windings may estimate more accurately the condition and position of the entire motor and thus operate the motor more efficiently. This aspect of the invention is enabled by the embodiments described below.

In an embodiment, for each sub-winding, the controller part associated with that sub-winding (or at any rate, the control system) measures the voltage potential across each combination of phases so as to estimate the back-EMF phase voltages imparted on the sub-winding from the rotation of the motor. This is similar to the behaviour of a conventional sensorless controller measuring the phase voltages across a single winding in a conventional controller, but the existence of multiple, electrically independent sub-windings within the present invention means that the control system may obtain several estimates of the back-EMF arising from each electrically independent sub-winding. These several estimates may be combined to produce an overall estimate of back-EMF that is more precise and potentially more accurate than the estimate that would have been produced from a single phase winding in a conventional motor.

Figure 6:
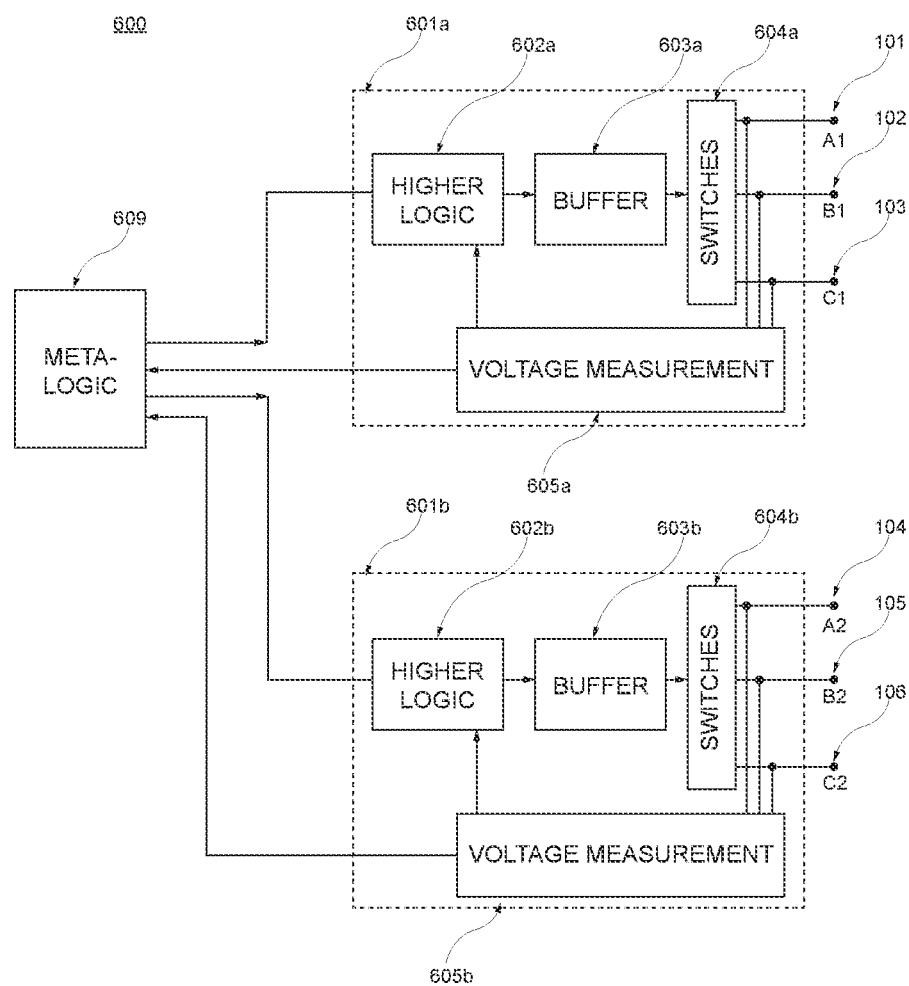
FIG. 6 is a block diagram of a control system suitable for controlling a motor having two sub-windings.

FIG. 6 shows a block diagram of a control system 600 suitable for controlling a motor having two sub-windings, with respective connections 101-103 and 104-106, according to an embodiment. The control parts are constructed in a manner similar to the individual controller of FIG. 4. Each control part 601a, 601b has a higher logic (602a, 602b, a buffer 603a, 603b, switches 604a, 604b and a voltage measurement module 605a, 605b. In the embodiment of FIG. 6 there is an additional higher-level "metalogic" block 609 that is capable of comparing and correcting the high-level logic within each sub-controller, so that the performance of each sub-controller may be improved by the metalogic having access to all sub-controllers. In this example the metalogic 609 has access to the back-EMF voltage measurement data arising from each sub-winding. The metalogic calculates an estimate of the motor's position based on all of the available back-EMF data. In an embodiment, this comprises applying a least-mean-squares method that is suitable to the winding pattern of the motor to combine the data arising from different sub-windings. The calculation of motor position that the metalogic produces can be assumed to be more accurate, in general, than the calculations of motor position that are (or could be) produced by the higher logic associated with each sub-controller in isolation, using only the back-EMF data arising from its own associated sub-winding.

A more accurate and reliable estimate of the motor's back-EMF means that the motor's condition and position are more accurately known. This means that "commutation" (i.e. the switching of current among the phases of the windings) can occur with a more optimal timing. A more optimal timing can, in general, improve the motor's efficiency, reduce noise, and improve the motor's peak torque and power capabilities.

The various sub-windings in the motor are electrically independent, i.e, insulated, from one another. Therefore, their respective voltages represent independent measurements of back-EMF and motor position. Independent measurements can be combined using a least-mean-squares calculation to produce a single estimate with greater confidence than any of its inputs. When each measurement is theoretically a measurement of the same quantity, then an arithmetic mean is the least mean squares estimate of the "true" quantity. Thus, one implementation of the present invention is to produce independent estimates of motor position arising from each sub-winding and then to combine these using an arithmetic mean. For example, three sub-windings could give rise to estimates of a motor's electrical position that are 350°, 356° and 2° respectively. With sensitivity to the problem of wrap-around at 0°, a control system could combine these estimates to 359° using an arithmetic mean.

A more sophisticated approach to combining the data from various electrically independent sub-windings is to combine the voltage measurements that are used to estimate back-EMF. Rather than calculating independent back-EMF estimates and motor position estimates for each sub-winding, the control system can calculate a single estimate of motor position based on the data from all sub-windings taken together. This approach is potentially more accurate than a result calculated from independently calculated position estimates. By comparing voltage data from the various sub-windings, better filtering is possible. "Bad" or spurious data may be detected or diluted by comparison to data arising from other sub-windings in the course of formulating a single position estimate, rather than the bad data being propagated into an independent position estimate for a given sub-winding which is later compared to other independent position estimates. Ultimately, a control system that compares and cross-checks data from the various electrically independent sub-windings earlier in the calculating procedure is able to maintain a stable and reliable calculation with less heavy reliance on filtering. A position estimate for an electrically independent sub-winding, based upon a given quantity of measured voltage data, "X" measurements, will require more filtering of the input data to maintain a stable calculated compared to a position estimate for an entire motor containing three electrically independent sub-windings and "3X" voltage measurements, because a certain amount of de-facto filtering and stabilisation will arise from the use of a larger (in this example, three times larger) data set as input to the position estimation calculation.

In a motor with multiple windings, the various windings are not expected to be exposed to the same back-EMF voltages at the same time in general. The various sub-windings of a given winding may:

(1) be phase offset from one-another (if the conductors of one sub-winding are physically located with a circumferential offset from the conductors of another sub-winding);
(2) have different frequencies (if the conductors of one sub-winding are distributed among a greater number of circumferential locations than the conductors of another winding (ie one winding passes through more slots than another, if the motor has slots)); or
(3) have different amplitudes (if the conductors of one sub-winding pass along the motor's length a greater number of times than the conductors of another winding (ie, one sub-winding has more "turns" than another)).

The data from various windings can nevertheless be combined using a least-mean-squares approach, according to well-known mathematical techniques for least-mean-squares sinusoidal parameter estimation. In most cases, It can be reasonably assumed that all of the back-EMF signals have the same known frequency (known to be similar to the most recently estimated frequency, because of the motor's conservation of angular momentum) and to have phase offsets that are known (from the motor's construction). With these assumptions, sinusoidal least-mean-squares estimation is in general directly solvable. In a general case, well-known regression techniques can be used to approach the least-mean-squares estimate of sinusoidal quantity where there are different sample data distributed through phase offset (different sub-windings) and time (historically sampled data).

Figure 7:
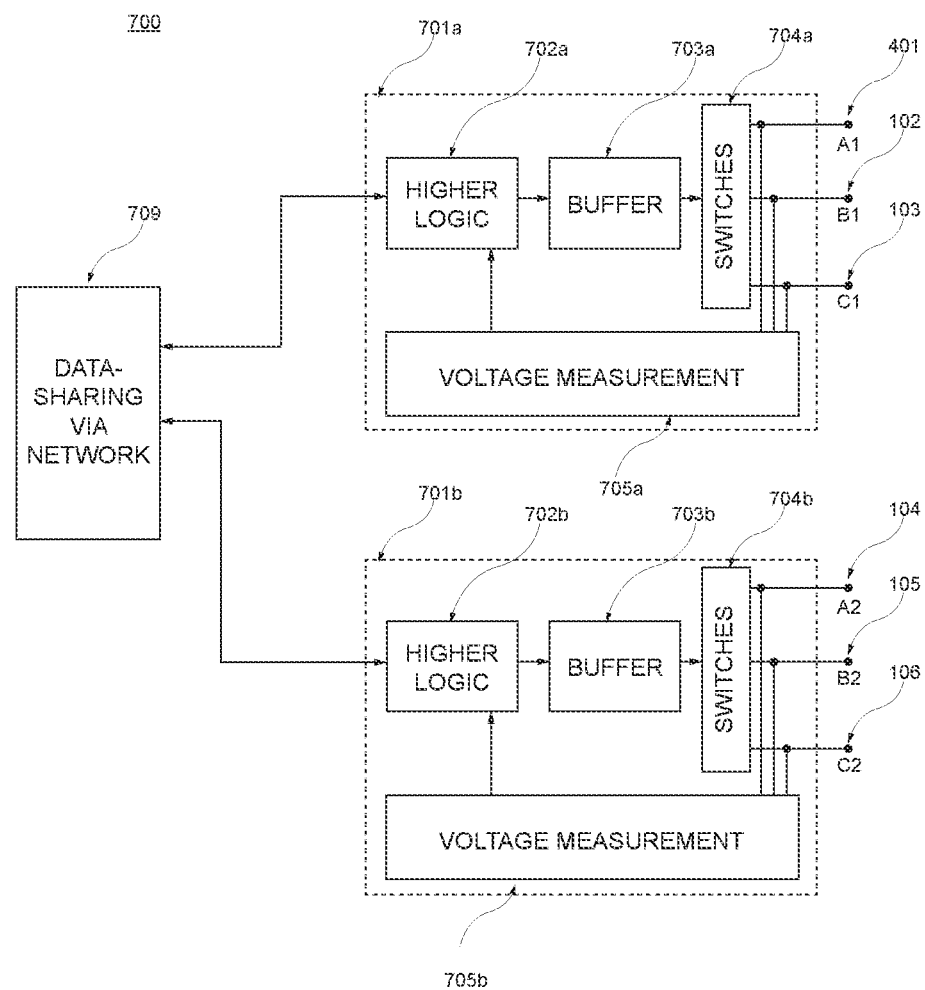
FIG. 7 shows a block diagram of another control system suitable for controlling a motor having two sub-windings.

FIG. 7 shows a block diagram of another control system 700, according to an embodiment. This control system is suitable for controlling a motor having two sub-windings. As before, each controller 701a, 701b has a higher logic 702a, 702b, a buffer 703a, 703b, switches 704a, 704b and a voltage measurement module 705a, 705b. In the embodiment of FIG. 7, there is no locally housed "metalogic" governing each sub-controller as in the embodiment of FIG. 6. Instead, each sub-controller is working based on its own calculation of motor position. However, the various sub-controllers are not functionally independent; they share data 709, be it calculated position data, raw back-EMF data, or some other filtered or intermediate data, so that the function, within each sub-controller, estimating motor position is informed by a larger dataset than the data obtained from its own associated sub-winding. Thus, the arrangement shown in FIG. 7 could produce the same fidelity as the arrangement shown in FIG. 6, but it is more suited to distributed processing or to connecting sub-controllers over a network.

Figure 8:
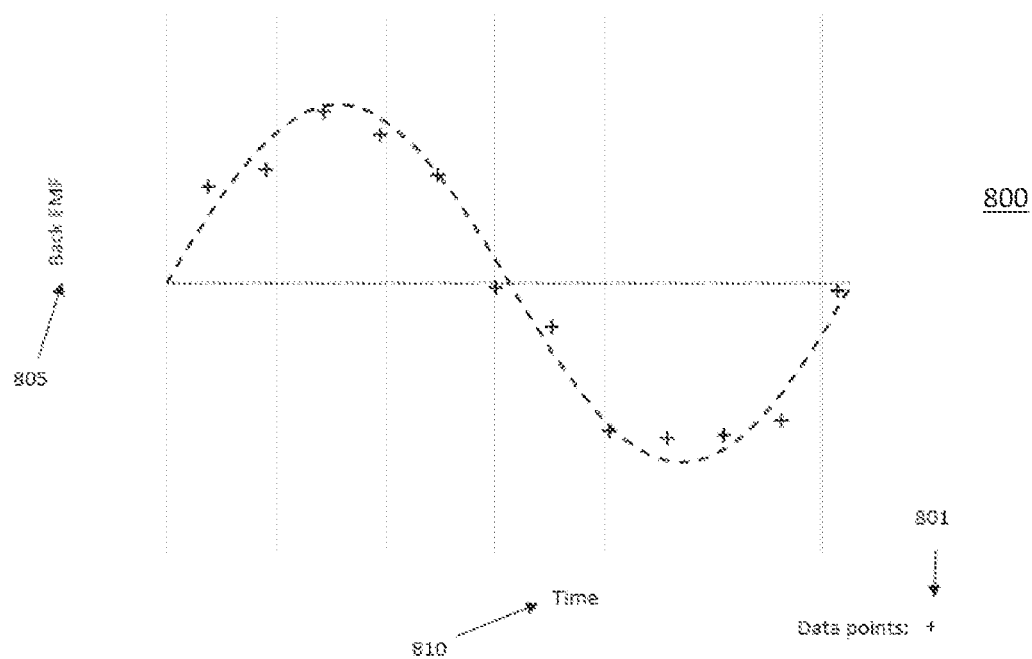
FIG. 8 is a graph showing back EMF voltage data collected over time from a one phase-to-phase measurement of a winding within a motor.

FIG. 8 is a graphical representation of back EMF 805 against time 810, with data points 801, illustrating the extent to which sinusoidal least-mean-squares estimation 800 can be more useful than linear (arithmetic mean) least-mean-squares estimation. The figure illustrates an extreme case in which historical back EMF data is available for an entire period. In this case, an arithmetic mean would be expected to produce a zero value back EMF estimate (the dotted line in FIG. 8), whereas sinusoidal estimation would produce a much better fit to the data (the dashed line in FIG. 8).

Figure 9A:
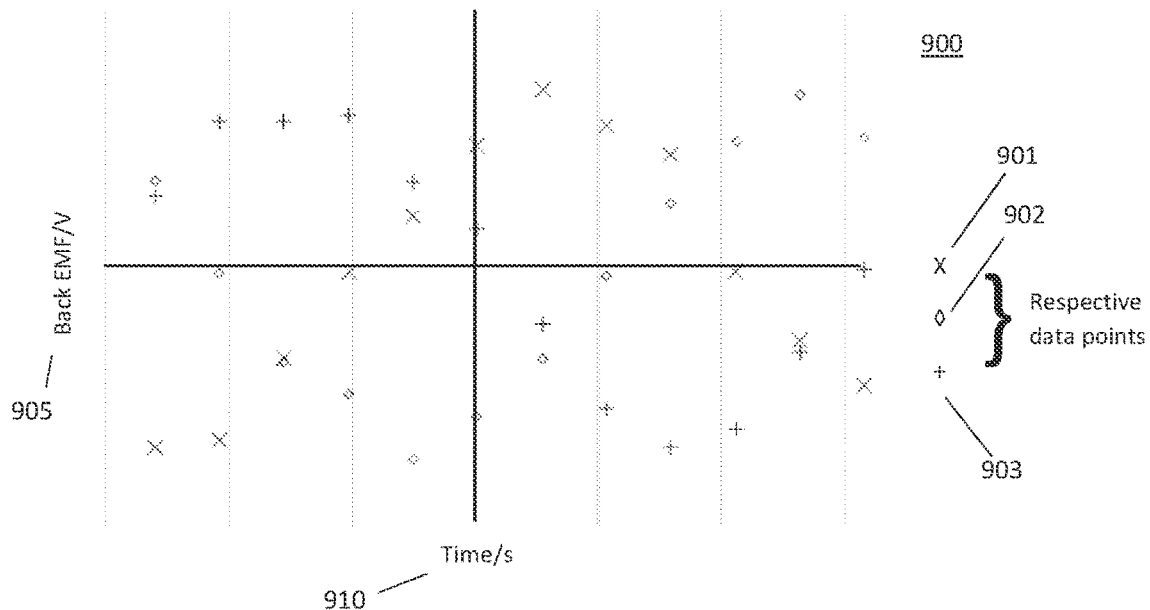
FIG. 9a is a graph showing back EMF voltage data collected from three phase-offset phase-to-phase voltages, either from the same winding or different windings.
Figure 9B:
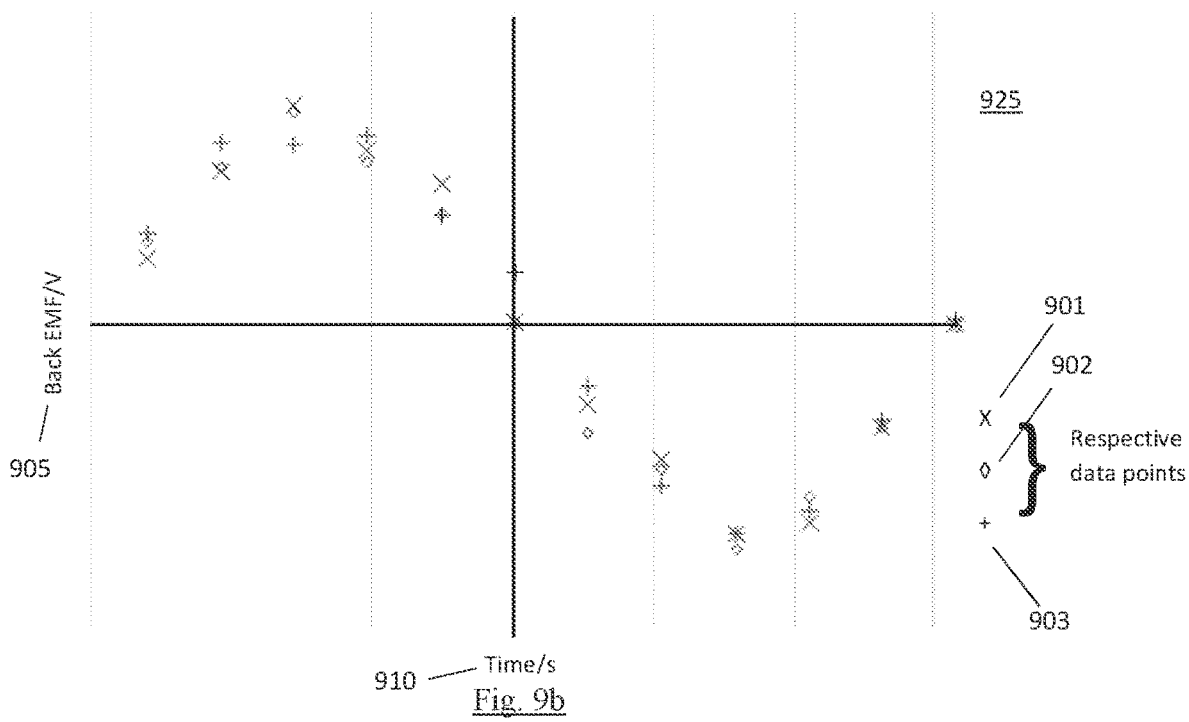
FIG. 9b is a graph showing the same data phase-shifted so that they appear in-phase with each other.
Figure 9C:
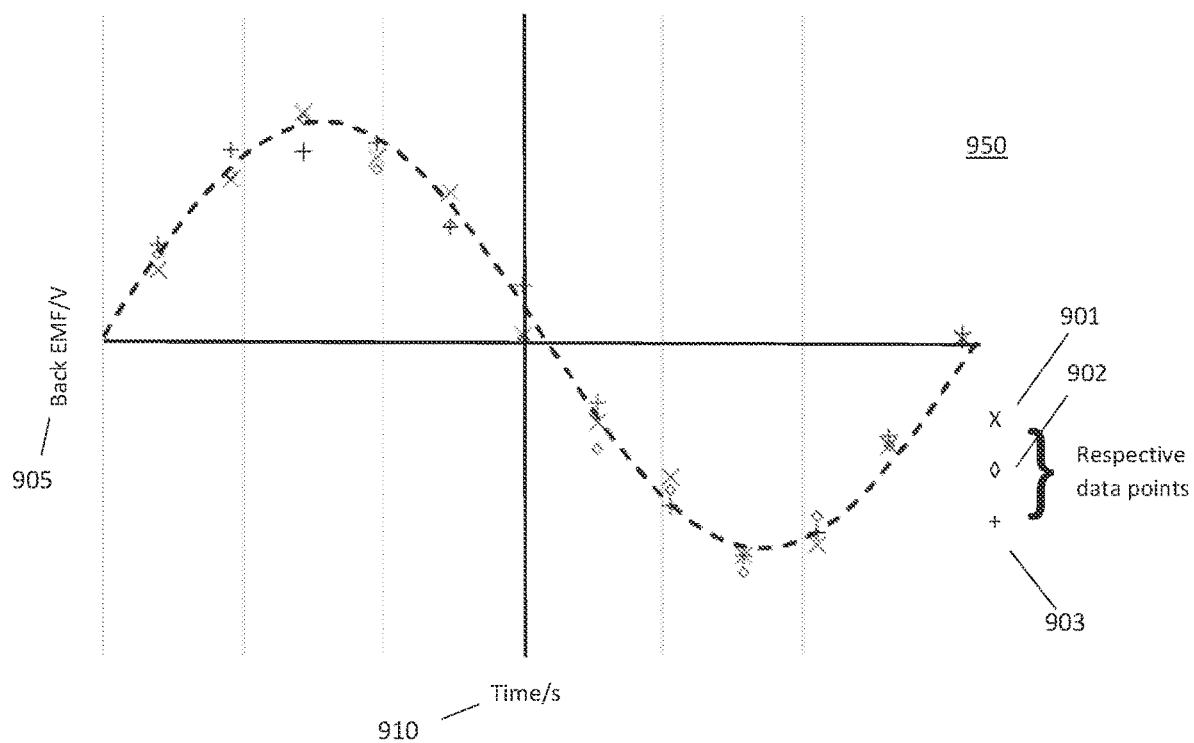
FIG. 9c is a graph showing a sinusoidal least-mean-squares estimate for the data, calculated by taking all the phase-corrected data together (as if all the data measured just one phase-to-phase voltage).
Figure 9D:
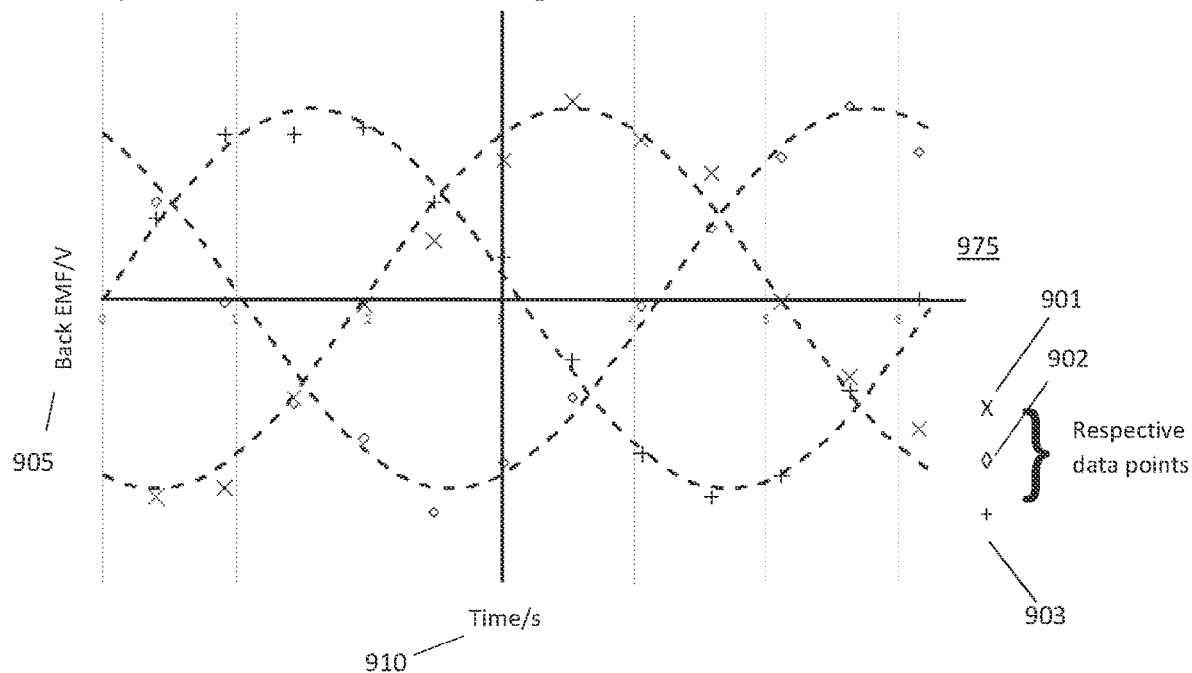
FIG. 9d is a graph showing the original data returned to its original phase offset from FIGS. 10 to 15 are flow charts illustrating methods according to embodiments.

FIGS. 9a, 9b, 9c and 9d are graphical representations of back EMF 905 against time 910, with data points from different subwindings, illustrating how data from phase-offset data 901, 902, 903 (arising from different phase-to-phase voltage measurements within the same windings or arising from phase-to-phase voltages measured in different windings) can be combined to produce a sinusoidal least-mean-squares estimation that is based upon a broader set of data and is therefore expected to be more accurate as an estimate of back EMF. The measured data are shown in FIG. 9a. Here, the data have a phase offset that is known from the construction of the motor. The known phase offset is removed by shifting the data along the x-axis so that all the data have the same phase angle, as shown in FIG. 9b. A sinusoidal least-mean-squares estimation algorithm is applied, so that a sinusoidal function is produced that best fits all of the available phase-shifted data (shown in FIG. 9c). This estimate, derived from all of the available data, is expected to be more accurate than any of the three estimates that could have been produced from each of the three original datasets. The estimate produced in the previous step is then phase-shifted by the opposite phase shift that was applied to the original data. Thus, three estimates are produced, each fitting one of the original datasets, as illustrated in FIG. 9d. Each estimate produced in this way is expected to exhibit a greater least-mean-squares error with respect to its corresponding measured back EMF data and yet be closer to the true back EMF waveform. This assertion can be made because it is known that the phase offset between the measured datasets is a precise and constant value arising from the motor's construction. Therefore, it is assumed that phase shifting the data has not introduced any error. Because phase shifting the data has not introduced any errors, the additional data taken from other phase angles reduces the error in the estimate in the same way as repeated measurements reduce the error in an arithmetic mean. By minimising the least-mean-squares error with respect to all of the (phase-shifted) data, this procedure has produced a sinusoidal least-mean-squares estimation that (with phase-shift) is a more accurate representation of back EMF voltage on all of the phases than are three separate sinusoidal estimates calculated from the original three phase-offset datasets in isolation from one-another. To the extent that the calculated back EMF voltage estimate is more accurate in phase angle (with respect to each of the phase-offset back EMF voltage signals) than estimates calculated from different datasets in isolation, so the commutation timing of the controller relying on this back EMF voltage estimate can be more accurate, allowing the motor to operate more efficiently. The embodiment of FIG. 9 illustrate the use of phase offset removal for a method using a least squares estimation. However, phase offset removal may be also used in other embodiments, such as with the use of a simple arithmetic mean.

Methods by which a back EMF may be estimated according to embodiments will now be described with reference to FIGS. 10 to 15. In an embodiment, an estimator is used to provide an estimate of the back EMF. An estimator is a statistical rule which provides one or more values for at least one estimator variable on the basis of data provided. In an embodiment, the estimator comprises the determination of the arithmetic mean of back EMF values at discrete time intervals, i.e. the estimator variable is the arithmetic mean. In an embodiment, the estimator comprises the determination of a plurality of estimator variables, wherein the estimator variables may be combined to determine an estimate of back EMF. In an embodiment, the estimator comprises the determination of a first estimator variable, a second estimator variable and a third estimator variable. In an embodiment, the estimator comprises the determination of parameters of a sine wave representing an estimate of the variation of the back EMF with time. In an embodiment, the first estimator variable is an amplitude of the sine wave, the second estimator value is a frequency of the sine wave and the third estimator variable is a phase of the sine wave. In an embodiment, the estimator comprises the use of least squares estimation.

In other words, in an embodiment, the overall back EMF is estimated by taking an arithmetic mean of the data supplied from each of the sub-windings, and this overall back EMF is used by the controller to infer various information about the motor, including its speed (from back EMF frequency), its temperature (from relating back EMF amplitude with speed) and its rotational angle (from back EMF phase angle). The motor's rotational angle, inferred from the overall back EMF, is used to determine the commutation timing, which is a primary function of a motor controller.

In another embodiment, the "overall back EMF" is a term that refers to a set of signals that are phase offset from one another and multiples of each other in amplitude or frequency according to the construction of the motor. This overall back EMF represents an aggregate best estimate of each of the back EMF signals from each of the phases and subwindings within the motor, wherein the errors in the respective readings have been minimised, taking account of all of the fixed offsets and differences between the various phases and subwindings that arise from the motor's construction. Thus, the overall back EMF is a set of data within the controller that represent the motor's state, including its rotational position, its speed, its temperature or state of wear, etc. From the overall back EMF, the best estimate value of any back EMF reading on any phase and subwinding may be calculated at any time. However, the invention is not limited to either of these embodiments, and any suitable estimator may be used to estimate an overall back EMF for the motor based on the readings taken from the sub-windings. The term phase in these embodiments refers to a phase which is estimated by the estimator, and is different from the fixed phase offset discussed above. The technique of phase offset removal may be used in conjunction with the estimation of phase for the estimation of the sine wave parameters.

When this description refers to a motor's position or rotational position or angle of rotation, this is taken to mean its electrical position, or the position of the poles of its rotors with respect to the position of the conductors within its stator. It may or may not also mean the physical rotational position of the motor's shaft with respect to the physical position of the motor's stator.

Figure 10:
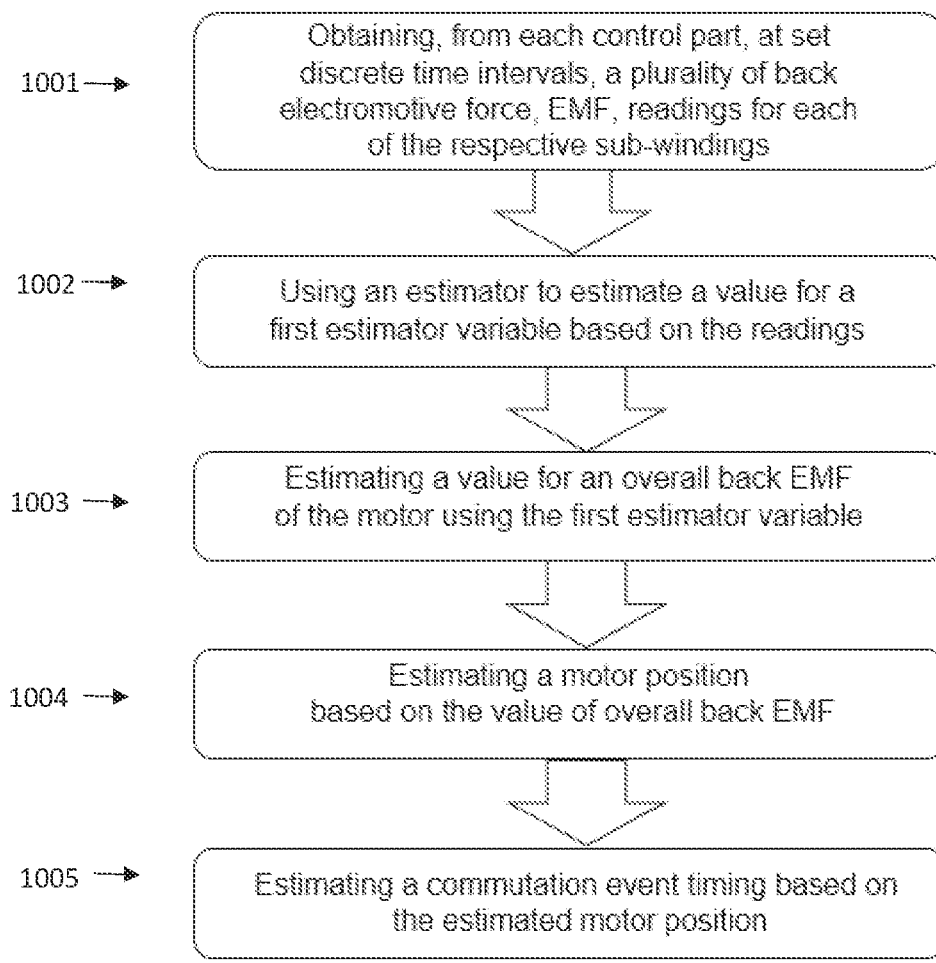

FIG. 10 is a flowchart illustrating a method according to an embodiment. The method comprises obtaining, 1001, from each control part, at set discrete time intervals, a plurality of back electromotive force, EMF, readings for each of the respective sub-windings, using an estimator to estimate a value for a first estimator variable based on the readings 1002, estimating a value for an overall back EMF of the motor using the first estimator variable 1003, estimating a motor position based on the value of overall back EMF, 1004, and estimating a commutation event timing based on the estimated motor position 1005. In an embodiment, the first estimator variable is the arithmetic mean and the estimator is the determination of the arithmetic mean. In other embodiments, there may be more than one estimator variable, for example, the first estimator value may be the amplitude of a sine wave, the second estimator variable may be the frequency of the sine wave and the third estimator may be the phase of the sine wave. The estimator is the estimation of the parameters of the sine wave, the sine wave representing the variation of the back EMF with time. The invention is not limited to any particular estimator or estimator variables. The person skilled in the art will appreciate that there may be other suitable estimators, with associated estimator variables, which may be used to estimate the back EMF.

Figure 11A:
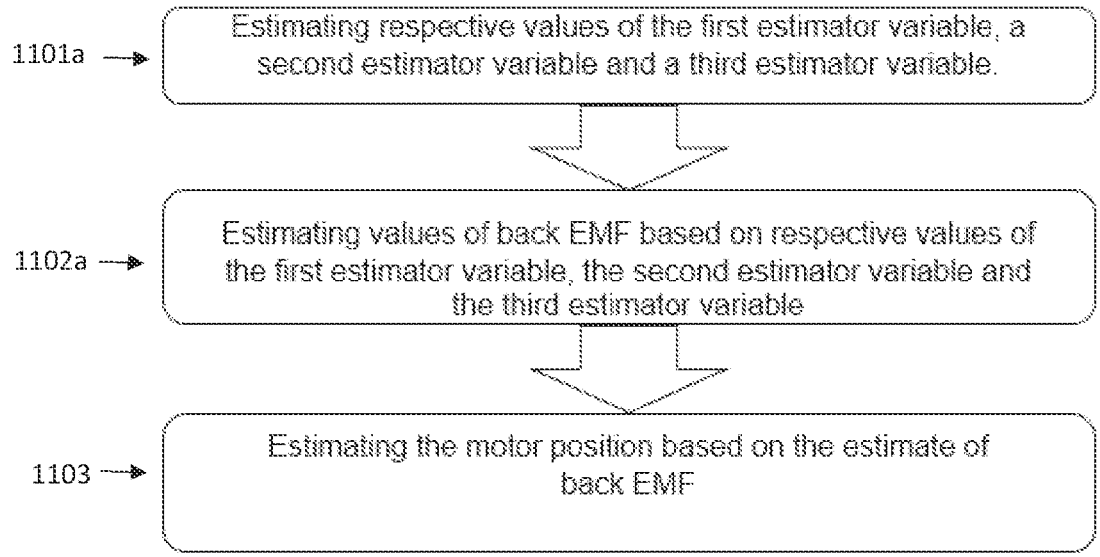
Figure 11B:
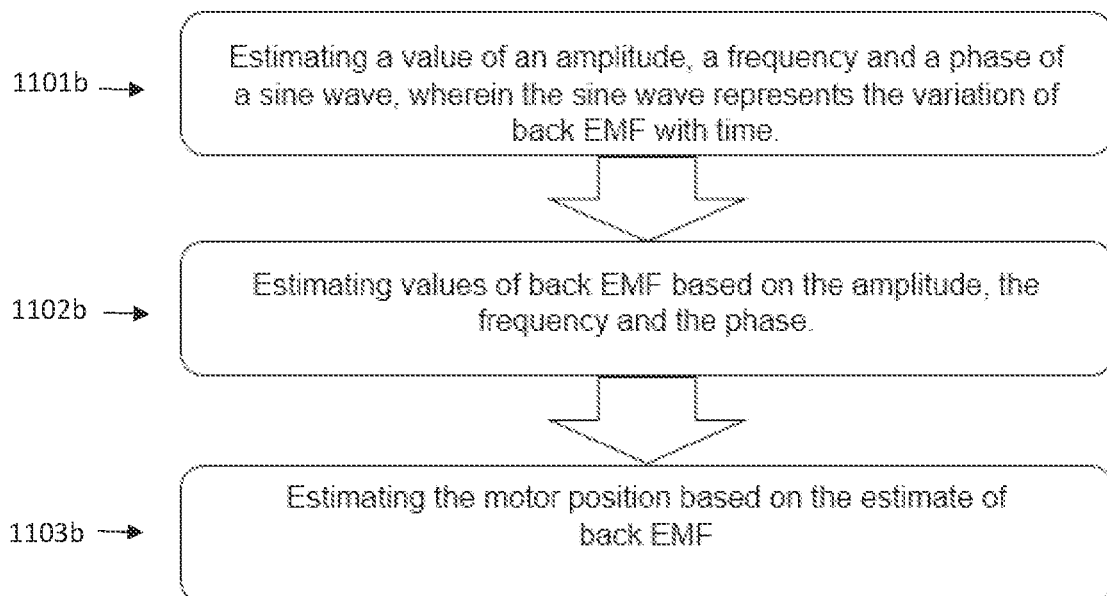

FIG. 11a is a flow chart illustrating a method according to an embodiment. The method comprises the steps of estimating respective values of the first estimator variable, a second estimator variable and a third estimator variable 1101a, estimating values of back EMF based on respective values of the first estimator variable, the second estimator variable and the third estimator variable 1101a, and estimating the motor position based on the estimate of back EMF 1103a. FIG. 11b is a flow chart illustrating a method according to an embodiment. The method comprises the steps of estimating a value of an amplitude, a frequency and a phase of a sine wave, wherein the sine wave represents the variation of back EMF with time 1101b, estimating values of back EMF based on the amplitude, the frequency and the phase 1102b, and estimating the motor position based on the estimate of back EMF 1103b.

Each sub-winding and associated controller part, in general, transmits less power into the motor than one winding and one controller serving the same motor. Therefore, each sub-winding may be subject to less distortion than a single winding, with phenomena such as freewheeling being less pronounced and distributed among all the windings. In other words, the voltage signal measured on each sub-winding could in general be more strongly a function of the motor electromagnetism and less strongly influenced by the controller's power supply and diode losses, as compared to a single winding and controller. For the voltage of a motor's winding to be influenced entirely by the motor's electromagnetism and not at all by the controller's power supply is an ideal situation. To the extent that this is true, the measured voltage is a good estimate of back-EMF, a good indication of the motor's position and condition, and a useful indicator of when the controller should affect commutation. The control system of a motor with multiple sub-windings, or the motor itself, could be designed to exaggerate the differences between sub-windings, for example by providing less power or no power to one of the sub-windings. In this case, the voltage signals measured from the winding receiving less power can be treated as a better estimate of back-EMF, with less distortion from the control system's power supply. This can be taken into account in the overall estimate of motor position by the control system by assigning a greater weight to the data from the winding receiving less power.

For example, a motor may have two electrically independent sub-windings A and B that are identical in their winding pattern but that contain different numbers of parallel conductors. Sub-winding A has 3 times as many parallel conductors as sub-winding B, and the control system for the motor is configured in such a way as to send 75% of any current to sub-winding A and 25% to sub-winding B. A designer would expect the voltage measurements taken at sub-winding B to be a more accurate representation of the motor's back-EMF than the measurements taken at sub-winding A. In this example, the control system may assign a weighting factor of 3, or some other weighting factor based on experimentation or analysis, to voltages measured at sub-winding B so that any least-mean-squares estimate of back-EMF is biased towards the measurements from sub-winding B.

Figure 12:
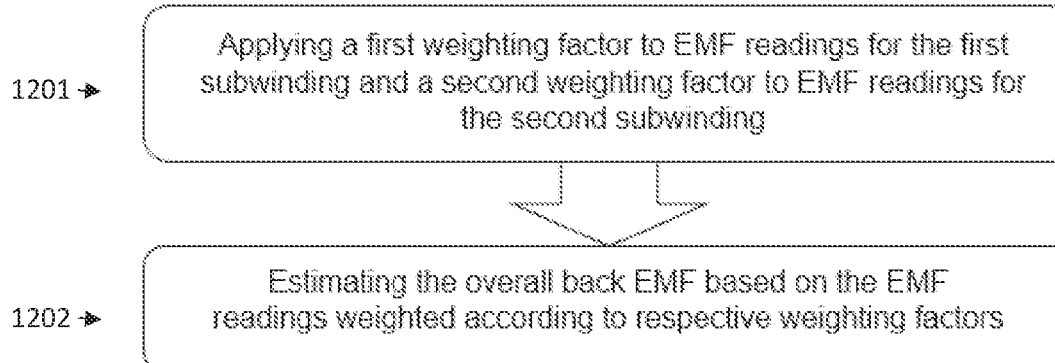

FIG. 12 is a flow chart illustrating a method according to an embodiment. The method comprises the steps of applying 1201 a first weighting factor to EMF readings for the first subwinding and a second weighting factor to EMF readings for the second subwinding, and estimating the overall back EMF based on the EMF readings weighted according to respective weighting factors 1202. In an embodiment, the application of a first weighting factor to EMF readings for the first subwinding and a second weighting factor to EMF readings for the second subwinding may be used in conjunction with estimating values of an amplitude, a frequency and a phase of a sine wave representing the variation of the overall back EMF with time, i.e. wherein the first estimator variable is an amplitude of the sine wave, the second estimator variable is the frequency of the sine wave and the third estimator variable is the phase of the sine wave.

The application of a first weighting factor to EMF readings for the first subwinding and a second weighting factor to EMF readings for the second subwinding is not limited to embodiments in which an estimate of the parameters of a sine wave are determined. Weightings may be applied in conjunction with any estimator used for estimating overall back EMF. For example, in an embodiment, the application of a first weighting factor to EMF readings for the first subwinding and a second weighting factor to EMF readings for the second subwinding may be used in conjunction with the use of an arithmetic mean to estimate back EMF.

In an embodiment, different weightings may be applied according to the physical construction of the windings, for example, the number of parallel conductors, as discussed above. In another embodiment, weightings may be applied according to the likely reliability of readings. In an embodiment, multiple motors may be interlinked, enabling back EMF readings to be combined from different motors. In an embodiment, the respective controllers of the interlinked motors may be networked. The readings from a different motor may be less reliable than those from the motor for which estimates of position etc. are being made. The readings from different motors may therefore be given a lower weighting from the readings of the subject motor.

In another example, a motor may have two sub-windings A and B that are identical in their winding pattern and number of parallel conductors. The control system for this motor could send equal current to both windings on average over time, but it could periodically introduce an inequality to improve its estimate of back-EMF. For example, once per 100 revolutions the controller could send 60% of the electrical current to sub-winding A and 40% in to sub-winding B. It could also do the opposite once per 100 revolutions— sending 40% of the electrical current to sub-winding A and 60% to sub-winding B. During only those times when the currents are unequal, the control system will bias the measured voltage signals with weighting factors to favour the sub-winding receiving less current, being the sub-winding whose voltage is expected to represent a more accurate estimate of back-EMF. Considering that the estimate of back-EMF calculated from a biased least-mean-squares calculation when the currents among the sub-windings are unequal will be more accurate than the estimate of back-EMF obtained when the currents among the sub-windings are equal, the control system may also record the phase angle of the motor calculated at times of unequal current flow and use this to detect or correct errors in the back-EMF estimate calculated at times of equal power flow, either by using a least-mean-squares estimate of back-EMF that includes weighted values of the contemporary voltage readings with weighted values of the readings taken at a time of unequal current flow; or by applying a fuzzy logic method of excluding points from the contemporary dataset that deviate too much from the data obtained during a time of unequal current flow.

Figure 13:
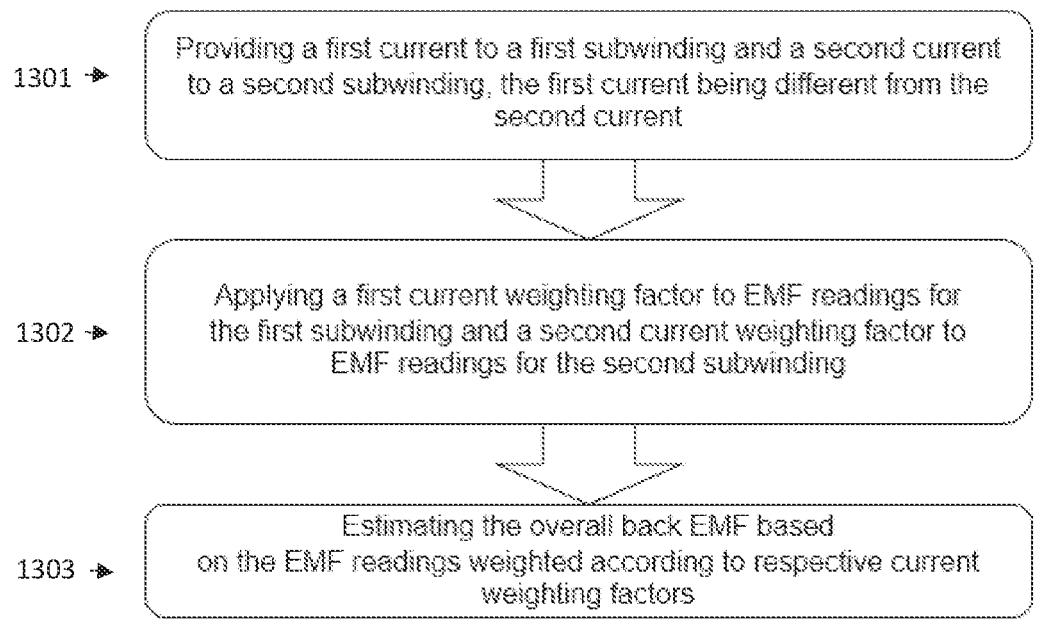

FIG. 13 is a flow chart illustrating a method according to an embodiment. The method comprises the steps of providing 1301 a first current to a first subwinding and a second current to a second subwinding, the first current being different from the second current, applying 1302 a first current weighting factor to EMF readings for the first subwinding and a second current weighting factor to EMF readings for the second subwinding; and estimating the overall back EMF based on the EMF readings weighted according to respective current weighting factors 1303. In an embodiment, the first current corresponds to a current level in normal operation of the motor and the second current corresponds to a current level lower than the current level of normal operation. Here, the current level in normal operation refers to a current operating level for the desired state of operation of the motor. A subwinding is selected to receive a lower current for a set period. The lower current enables a more accurate reading of back EMF. A higher weighting may be given to readings obtained from the sub-winding receiving the lower current. In an embodiment, a higher current is provided to other windings during the set period in order to maintain the overall power of the motor. In an embodiment, the different currents are alternated between the different sub-windings. In other words, different sub-windings receive the lower current in different periods.

Figure 14:
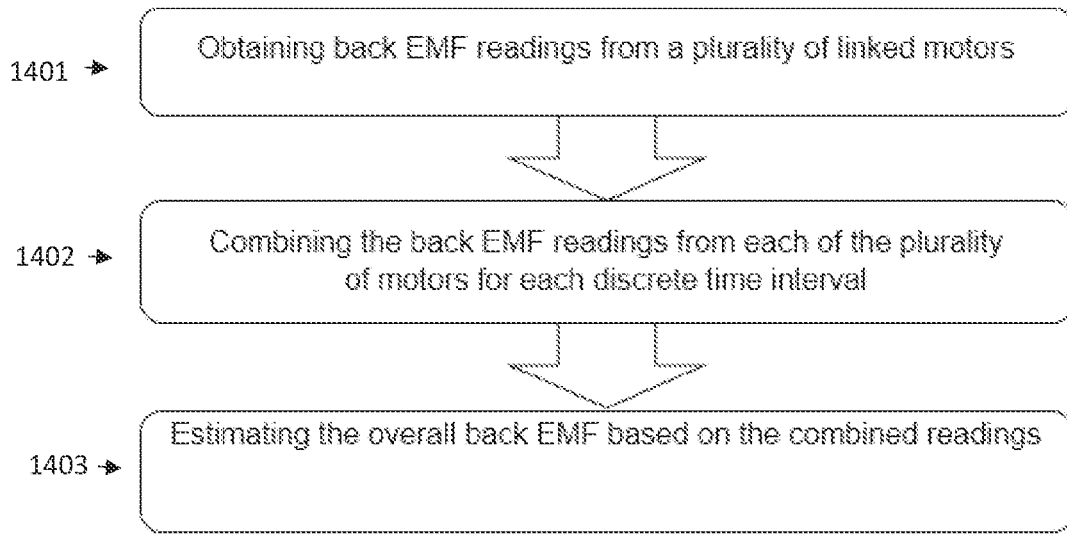

FIG. 14 is a flow chart illustrating a method according to an embodiment. The method comprises the steps of obtaining 1401 back EMF readings from either a plurality of linked motors or a plurality of subwindings, combining 1402 the back EMF readings from each of the plurality of motors for each discrete time interval and estimating the overall back EMF based on the combined readings 1403. The data is obtained from the motors, and is treated in the same manner as data from a single motor in previous embodiments. For example, in an embodiment, arithmetic means of the data values may be taken. In another embodiment, parameters of a sine wave representing the variation in back EMF over time may be estimated based on the combined data. The combination of data from different motors may be combined features of any of the methods disclosed above in conjunction with a single motor. In an embodiment, the method may be applied to a plurality of linked motors, wherein the respective controllers of each of the linked motors are networked.

Figure 15:
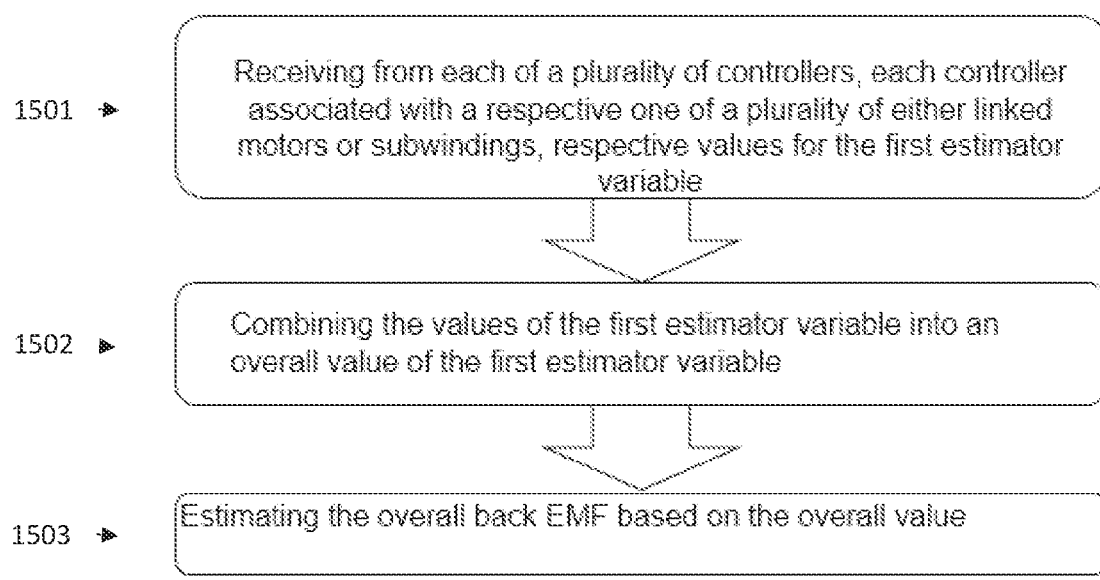

FIG. 15 is a flow chart illustrating a method according to an embodiment. The method comprises the steps of receiving from each of a plurality of controllers, each controller being associated with a respective one of a plurality of linked motors, respective values for the first estimator variable 1501, combining the values of the first estimator variable into an overall value of the first estimator variable 1502, and estimating the overall back EMF based on the overall value 1503. In an embodiment, the first estimator variable is the arithmetic mean of the data readings for each time interval. In another embodiment, a plurality of estimator values may be combined. In an embodiment, the first estimator variable is an amplitude of a sine wave, a second estimator is a frequency of the sine wave and a third estimator is the phase of the sine wave. The technique of combining the values of estimator variables obtained from multiple motors, or multiple windings or groups of windings within a single motor or multiple motors may be used with an suitable estimator and associated estimator variables.

A motor having electrically isolated sub-windings may provide different winding patterns in each of the sub-windings, so that each sub-winding may be optimised for a different motor operating condition. For example, a sub-winding with a greater number of turns could enable more efficient operation at low speeds, and its use (the proportion of current that the sub-winding receives or the weighting factor placed on its measured voltages or both) could be greater during low-speed operation than the use of other sub-windings. However, during high-speed operation, the sub-winding with the greater number of turns could be used equally other sub-windings or not used at all, the back-EMF voltage on the sub-winding with a greater number of turns being larger than the voltage of the control system's power supply input. It could be useful for the motor to incorporate this sub-winding with a greater number of turns in order to have more efficient operation at low speed, even if the sub-winding is not used during high-speed operation and increases the cost and size of the motor relative to its full-load rated performance capability.

If a motor has a very high pole number but a low number of turns, meaning that there are a large number of changes in magnetic polarity about the motor's rotor but a limited number of times that the conductors in the winding may cross and re-cross the length of the motor to interact with those magnets, then this circumstance will drive the adoption of a controller with a high-frequency switching capability, so that the polarity of the conductors in the limited number of turns can change as frequently as magnets of different polarity pass by on the rotor. A design incorporating electrically isolated sub-windings can potentially operate lower controller switching frequencies in this type of application. If the sub-windings are offset from one another about the circumference of the motor, then the controller parts handling each sub-winding will operate with a time offset, and the effect of this time offset on the motor is similar to the effect of increasing the switching frequency in the case of a motor with a single winding. For example, consider a motor with 8 poles and a 3-phase winding distributed among 24 slots. Consider that this motor has an operating speed of 30,000 revolutions per minute or 500 Hz. With 8 poles, the electrical frequency of the motor will be 2 kHz. In order to achieve adequate control of the motor with a conventional pulse width modulation strategy, the controller may need to operate an internal frequency of 40 kHz (the exact designed frequency being also a function of the inductance and capacitance of the system, the cost target for the design, the target efficiency and efficiency map width, and other factors. However, the same or similar design targets could be achieved if the same coper conductors were distributed into two electrically independent sub-windings, distributed into 12 slots each. In this configuration, the two electrically independent sub-windings would be identical except for being 15 degrees offset from one another about the circumference of the motor. The control system could operate each sub-winding with an electrical frequency of 1 kHz with a relative electrical phase offset of 180 degrees from one another. Thus, each sub-winding would behave as an additional half turn of the other sub-winding. In this way, the duty of the motor's windings are divided among two sub-windings and the controller may operate with one half the internal frequency of a controller handling a single winding. As previously noted, the act of distributing the current among two sub-winding may also make controller components easier or cheaper to source. Additionally, the inductance and capacitance of the system relative to the electrical operating frequency and the current levels may allow for a smoother and more easily controlled system, or at any rate offer more flexibility to the designer of the motor/controller system.

In one embodiment, the current passing through one of the sub-windings may be switched off entirely for a brief period (normally amounting to a fraction of one revolution of the motor). When a sub-winding exists in this condition, having little or no current flowing through its phase windings, it behaves as in an open circuit condition, and the phase voltages measured at its terminal connections become equal to or nearly equal to the motor's back-EMF. Even if carried out only once per multiple revolutions of the motor, this procedure may dramatically improve the controller's estimate of back-EMF, the improved estimate being useful subsequently to correct or to phase-offset measurements of phase voltage that are observed by the controller during the motor's normal operation, in each of the motor's sub-windings. The above corrections allow the controller to operate more efficiently, particularly if it is equipped with sufficient mathematical capabilities to apply machine learning or fuzzy logic to problem of reconciling open-circuit measured phase voltages with more recently-measured phase voltages occurring during normal operation.

For example, a sub-winding may complete one whole electrical period while in an open-circuit condition, record the measured and filtered phase voltage at every sampling point during that period, and then use this recorded data as the estimator for back-EMF through several subsequent revolutions. Through these subsequent revolutions, the controller observes "marker data", such as a phase voltage signal within a sub-winding reaching a certain value that is known a-priori by the controller's programmer to be a reliable measurement, not occurring near a phase angle in which the sub-winding's controller is commutating the sub-winding. When a "marker" is observed, the controller recalibrates its estimate of its position, counting forwards again from the latest observed "marker" to maintain an estimate of its position. The position is identically the phase angle of the motor with respect to the previously recorded back-EMF estimate (the phase voltage recorded during the most recent instance of open-circuit operation). The controller determines when to enact a commutation of the motor by: (a) maintaining an estimate of phase angle based on a recently-observed "marker" incremented by a counter, (b) maintaining an estimate of each phase back-EMF function recorded during a previous instance of operating the motor "open-circuit", (c) deriving an instantaneous estimate of the back-EMF of each phase by looking-up the value of the back-EMF function (from b, above) with the phase angle estimate (from a, above). The value of the back-EMF function (b) at the phase angle (a) is, for each phase and each sub-winding, compared to the same values for all other phases in the same sub-winding and all phases in all other sub-windings to determine commutation timing. Thus, the back-EMF estimate derived from occasional "open-circuit" operation of a given sub-winding is used, in preference to instantaneously-measured phase voltage, to determine commutation timing in various of the phases and sub-windings.

By the methods of using partial back-EMF data described above, even a very poor or distorted phase voltage signal can provide occasional good data for use as a "marker". Therefore, a motor applying this method of occasional open-circuit operation on any of its sub-windings, combined with "marker" data from each of its sub-windings can produce more reliable and correct commutation timing in all of its sub-windings than a motor that does not operate occasionally in open-circuit mode or does so without the benefit of multiple distinct sub-windings to multiply the available data. Furthermore, the prospect of temporarily eliminating the current flowing through a winding in order to perform this method is less daunting in a motor that contains multiple distinct sub-windings, whereby the current flowing to one sub-winding can cease to flow without the motor's entire power output falling to zero.

One further potential advantage of the approach presented here is that a large number of collocated or minutely-offset sub-windings may be excited with square waves in succession so as to synthesise a sinusoidal excitation. This can be imagined as a net resulting sine wave excitation that is composed of small steps. As each successive sub-winding is switched from "off" to "on-positive" or "off" to "on-negative", the net resulting sine wave moves one step higher or lower in voltage. As the crest of the motor is reached, the first sub-winding returns to the "off" state, and the net resulting sine wave takes one small step closer to the zero voltage state, etcetera until all the sub-windings are "off" and then the process begins again with the polarity reversed. The nature of the magnets used in the motor, the motor's geometrical construction, and/or the particular duty cycles of the motor might indicate that a sinusoidal excitation would be optimal, but it is often the case that a controller providing square-wave excitation can be cheaper or more robust. In the example cited above, the sine wave synthesised by steps created by the successive excitation of sub-windings requires no single sub-controller to switch any faster than the fundamental frequency of the net resulting sine wave—much slower, for example, than a controller that must create the same sine wave using a more conventional pulse-width-modulation control strategy. Furthermore, each switching event occurring on a particular sub-winding is switching only the amount of current associated with that sub-winding, a fraction of the total current that would be switched—for example—in a more conventional pulse-width-modulation control strategy.

What is claimed is:

1. A controller for a motor, the motor having a stator with a plurality of subwindings each having a plurality of phase connections for receiving phase voltages, wherein each of the subwindings is electrically insulated from each of the other subwindings, and a rotor comprising a plurality of permanent magnets or energisable electromagnets, the controller comprising:
 a plurality of control parts, each control part associated with a respective subwinding and each control part being configured to monitor phase voltages of the associated subwinding, between phase connections; and
 metalogic configured to:
  obtain, from each control part, at set discrete time intervals, back electromotive force, EMF, readings for the associated subwinding;
  for each control part, using the obtained readings to estimate an amplitude of a sine wave, a frequency of the sine wave, and a phase of the sine wave;
  estimate a value for an overall back EMF of the motor using the estimated amplitudes, frequencies and phases;
  estimate a commutation event timing based on the overall back EMF; and
  provide the commutation event timing to the control parts.

2. The controller according to claim 1, the metalogic being further configured to use the obtained readings to estimate a motor position.

3. The controller according to claim 1, configured to estimate respective values of the amplitude of the sine wave, the frequency of the sine wave, and the phase of the sine wave using a least squares estimate.

4. The controller according to claim 1, configured to provide voltages with a phase offset between the subwindings and, further configured to remove the offset from the back EMF readings prior to estimating an overall back EMF of the motor.

5. The controller according to claim 1, configured to control a motor wherein a first sub-winding of the plurality of subwindings has a first number of parallel conductors and a second sub-winding of the plurality of subwindings has a second number of parallel conductors, the first number of parallel conductors being different from the second number of parallel conductors.

6. The controller according to claim 5, further configured to:
 apply a first weighting factor to EMF readings for the first subwinding and a second weighting factor to EMF readings for the second subwinding; and
 estimate the overall back EMF based on the EMF readings weighted according to respective weighting factors.

7. The controller according to claim 1, further configured to:
 provide a first current to a first subwinding and a second current to a second subwinding, the first current being different from the second current, and wherein the controller is further configured to:
 apply a first current weighting factor to EMF readings for the first subwinding and a second current weighting factor to EMF readings for the second subwinding; and
 estimate a value for an overall back EMF of the motor based on the EMF readings weighted according to respective current weighting factors.

8. The controller according to claim 7, wherein the first current corresponds to a current level in normal operation of the motor and the second current corresponds to a current level lower than the current level of normal operation.

9. The controller according to claim 7, wherein the first current corresponds to a current level higher than the current level of normal operation of the motor and the second current is a current level lower than the current level of normal operation.

10. The controller according to claim 7, further configured to alternate the different currents between different subwindings.

11. The controller according to claim 1, further configured to:
 obtain back EMF readings from a plurality of linked motors;
 combine the back EMF readings from each of the plurality of motors for each discrete time interval; and
 estimate the overall back EMF based on the combined readings.

12. A system of networked controllers comprising a plurality of controllers according to any one of the preceding claims, configured to:
 receive from each of a plurality of controllers, each controller associated with a respective one of either: a plurality of subwindings or a plurality of linked motors, respective values for the first estimator variable;
 combine the values of the first estimator variable into an overall value of the first estimator variable; and
 estimate the overall back EMF based on the overall value.

13. A motor comprising a controller according to claim 1.

14. The motor according to claim 13, wherein said plurality of control parts exchange data relating to their respective commutation timings and use this data to perform corrections.

15. The motor according to claim 13, wherein the stator comprises a plurality of slots in which the phases of the subwindings are accommodated.

16. The motor according to claim 15, wherein a phase or phases of one subwinding shares or share slots with a phase connection or phase connections of one or more further subwindings.

17. The motor according to claim 16, wherein phases accommodated within the same slot are caused to be energised by their respective controllers substantially in synchronisation.

18. A method of controlling a motor, the motor having a stator with a plurality of subwindings each having a plurality of phase connections for receiving phase voltages, wherein each of the subwindings is electrically insulated from each of the other subwindings, and a rotor comprising a plurality of permanent magnets or energisable electromagnets, the method comprising:
obtaining, from each of a plurality of control parts associated with respective subwindings, at set discrete time intervals, a plurality of back electromotive force, EMF, readings for each of the respective sub-windings;
for each control part, using an estimator to estimate an amplitude of a sine wave, a frequency of the sine wave, and a phase of the sine wave;
estimating a value for an overall back EMF of the motor using the estimated amplitudes, frequencies and phases;
estimating a commutation event timing based on the overall back EMF; and
providing the commutation event timing to the control parts.

19. The method according to claim 18, wherein estimating respective values of the amplitude of the sine wave, the frequency of the sine wave and the phase of the sine wave comprises using a least squares estimate.

20. The method according to claim 18, further comprising providing voltages with a phase offset between the subwindings and removing the offset from the back EMF readings prior to estimating an overall back EMF of the motor.

21. The method according to claim 18, wherein a first subwinding of the plurality of subwindings has a first number of parallel conductors and a second subwinding of the plurality of subwindings has a second number of parallel conductors, the first number of parallel conductors being different from the second number of parallel conductors.

22. The method according to claim 21, further comprising:
applying a first weighting factor to EMF readings for the first subwinding and a second weighting factor to EMF readings for the second subwinding; and
estimating the overall back EMF based on the EMF readings weighted according to respective weighting factors.

23. The method according to claim 18, further comprising:
providing a first current to a first subwinding and a second current to a second subwinding, the first current being different from the second current;
applying a first current weighting factor to EMF readings for the first subwinding and a second current weighting factor to EMF readings for the second subwinding; and
estimating a value for an overall back EMF of the motor based on the EMF readings weighted according to respective current weighting factors.

24. The method according to claim 23, wherein the first current corresponds to a current level in normal operation of the motor and the second current corresponds to a current level lower than the current level of normal operation.

25. The method of claim 23, wherein the first current corresponds to a current level higher than the current level of normal operation of the motor and the second current is a current level lower than the current level of normal operation.

26. The method according to claim 23, further comprising alternating the different currents between different windings.

27. The method according to claim 18, further comprising:
obtaining back EMF readings from a plurality of linked motors;
combining the back EMF readings from each of the plurality of motors for each discrete time interval; and
estimating the overall back EMF based on the combined readings.

28. The method according to claim 18, comprising:
receiving from each of a plurality of controllers, each controller associated with a respective one of either: a plurality of subwindings or a plurality linked motors, respective values for the first estimator variable;
combining the values of the first estimator variable into an overall value of the first estimator variable; and
estimating the overall back EMF based on the overall value.

* * * * *